United States Patent
Hu et al.

(10) Patent No.: US 9,612,382 B2
(45) Date of Patent: Apr. 4, 2017

(54) LIGHT GUIDE PLATE AND SIDE-EDGE BACKLIGHT MODULE USING SAME

(75) Inventors: Chechang Hu, Shenzhen (CN); Hu He, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 712 days.

(21) Appl. No.: 13/583,630

(22) PCT Filed: Jul. 6, 2012

(86) PCT No.: PCT/CN2012/078259
§ 371 (c)(1),
(2), (4) Date: Sep. 8, 2012

(87) PCT Pub. No.: WO2013/189103
PCT Pub. Date: Dec. 27, 2013

(65) Prior Publication Data
US 2013/0343083 A1    Dec. 26, 2013

(30) Foreign Application Priority Data
Jun. 21, 2012    (CN) .......................... 2012 1 0208371

(51) Int. Cl.
*F21V 8/00*    (2006.01)
*F21V 7/04*    (2006.01)
*F21V 5/02*    (2006.01)

(52) U.S. Cl.
CPC .......... *G02B 6/0038* (2013.01); *G02B 6/0016* (2013.01)

(58) Field of Classification Search
CPC .......................... G02B 6/0038; G02B 6/0016
See application file for complete search history.

(56) References Cited

U.S. PATENT DOCUMENTS
2012/0113680 A1    5/2012    Nakai et al.

FOREIGN PATENT DOCUMENTS
CN    201903665    *    7/2011

OTHER PUBLICATIONS
Guo et al. CN 201903665 U English translation.*

* cited by examiner

*Primary Examiner* — Joseph L Williams
(74) *Attorney, Agent, or Firm* — Andrew C. Cheng

(57) ABSTRACT

The present invention provides a light guide plate and a backlight module using the light guide plate. The light guide plate has an upper surface forming upper micro-structures and a lower surface forming lower micro-structures. The upper and lower micro-structures are set parallel to propagation direction of the light that emits from a backlight source traveling within the light guide plate. The upper and lower micro-structures each include a plurality of periodically and successively juxtaposed strip-like units. Each of the strip-like units forms a prism. The strip-like units of the upper and lower micro-structures are juxtaposed in the same direction. With the combination and arrangement of the upper micro-structures and lower micro-structures, collimation of light is improved after the light from an LED light source enters the light guide plate so as to improve convergence of the light inside a section.

10 Claims, 5 Drawing Sheets

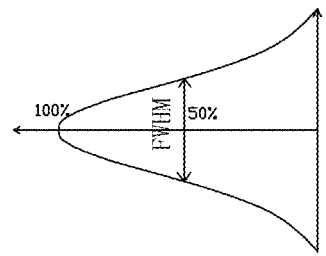
Fig. 4
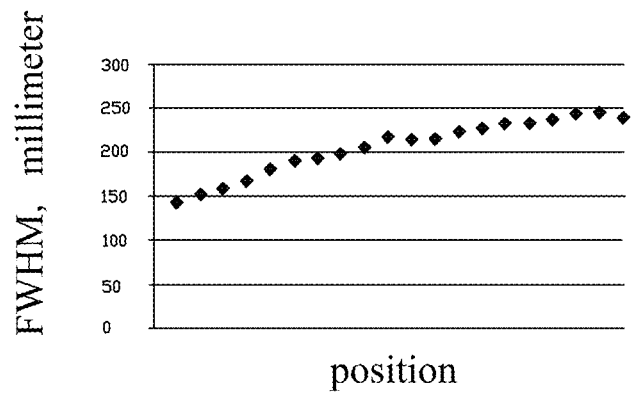
Fig. 5
| 1.93% | 3.91% | 5.11% |
| 1.50% | 3.92% | 6.30% |
| 3.38% | 8.83% | 14.55% |
Fig. 6

LIGHT GUIDE PLATE AND SIDE-EDGE BACKLIGHT MODULE USING SAME

BACKGROUND OF THE INVENTION

1. Field of the Invention

The present invention relates to the field of backlight module of liquid crystal display device, and in particular to a light guide plate and a side-edge backlight module using the light guide plate.

2. The Related Arts

The increasingly improved performance of LED (Light-Emitting Diode) brings continuous progress of LED backlighting for television, from the very initial four-side light incidence, to two-side light incidence, and then to single-side light incidence. The contemporary development and future direction of progress are set in single short edge light incidence.

Further, with the progress of 3D technology, 3D displaying function is now the main stream. The commonly known 3D displaying modes include shutter glass and film-type patterned retarder (FPR).

The shutter glass 3D displaying is effected with scanning backlight in combination with panel pixel scanning. Backlighting is often sectionalized so that a side-edge LED light bar is divided into multiple sections. When a first frame signal of a panel is applied to scan the first section, the LEDs of the first section are lit, while the remaining is set off. When the panel signal scans the second section, only the LEDs of the second section are lit. This is also applied to other sections. Such an operation is carried out for each frame. The performance of the shutter glass 3D displaying is assessed according to cross-talking among sections. The lower the cross-talking is, the better the displaying result will be. Cross-talking is generally determined according to cross talk among the backlight sections and design of timing sequence.

Cross-talking among backlight sections generally comes from the influence of brightness among different sections and the best situation is that when one section is lit, the backlighting of all the remaining sections shows darkness. As shown in FIG. 1, a side elevational view of a conventional light guide plate with upper microstructures is illustrated. Forming serrated microstructures on the upper surface (light exit surface) of a light guide plate is a commonly known design. FIG. 1 is made for observation of light guide plate 10 from the side where light gets incident. The upper surface of the light guide plate 10 forms upper microstructures 11 distributed on the upper surface of the light guide plate 10 in a successive raising-recessing-alternating arrangement in a direction perpendicular to the propagation direction of light in the light guide plate 10, whereby the geometric variation on the upper surface of the light guide plate is useful to eliminate the conditions for occurrence of total reflection. As shown in FIG. 2, a schematic view illustrating difference of light shape between a conventional flat light guide plate and an upper-microstructured light guide plate is given. Although FIG. 2 illustrates that the light shape of the upper-microstructured light guide plate 20 shows more confined light shape than a flat light guide plate 21, yet actually, even though light in the upper-microstructured light guide plate 20 is partially confined, it gets diverging to some extents.

With the increase of the propagation distance, the divergence of the light shape gets greater and shows severer influence on other sections. As shown in FIG. 3, a schematic view showing the distribution of light field of a well known upper-microstructured light guide plate 30 for the condition of one section being lit is given. When one section of the upper-microstructured light guide plate 30 is lit, the light shape is getting divergent with distance. Referring to FIG. 4, which is a schematic view showing the distribution of brightness in a vertical direction for the light shape shown in FIG. 3, the brightness distribution in the vertical direction can be indicated by full width at half maximum (FWHM), left side being the light incidence side. Referring to FIG. 5, which is a schematic view showing the variation of the width for half brightness at different locations with respect to the distance, in a single short edge light incidence, FWHM shows a trend of getting wider with the increase of distance. In other words, for single short edge light incidence, the remote side shows severer cross-talking than the light incidence side. Referring to FIG. 6, a schematic view illustrating the distribution of cross-talking for 9 points on a backlight module including the upper-microstructured light guide plate of FIG. 3 in a 3D mode is given. The left hand side of FIG. 6 is the light incidence side and it is clear that the remote side has severer cross-talking.

SUMMARY OF THE INVENTION

Thus, an object of the present invention is to provide a light guide plate, which improves collimation of light after the light enters the light guide plate so as to improve convergence of light within a section.

Another object of the present invention is to provide a side-edge backlight module, which reduces cross-talking between sections and also improves 3D displaying while realizing reduction of cross-talking during scanning of backlight.

To achieve the above objects, the present invention provides a light guide plate, which comprises an upper surface forming upper micro-structures and a lower surface forming lower micro-structures. The upper and lower micro-structures each comprise a plurality of periodically and successively juxtaposed strip-like units. Each of the strip-like units forms a prism. The strip-like units of the upper and lower micro-structures are juxtaposed in the same direction.

The strip-like units of the upper and lower micro-structures are selectively set in different shapes and specifications.

The strip-like units of the upper micro-structures are of a circular arc shape, while the strip-like units of the lower micro-structures are also of a circular arc shape. Arc length and radius of the circular arcs of the strip-like units of the lower micro-structures are smaller than arc length and radius of the circular arcs of the strip-like units of the upper micro-structures.

The strip-like units of the upper micro-structures are of a circular arc shape, while the strip-like units of the lower micro-structures are also of a circular arc shape. Arc length and radius of the circular arcs of the strip-like units of the lower micro-structures are identical to arc length and radius of the circular arcs of the strip-like units of the upper micro-structures.

The strip-like units of the upper micro-structures are of a circular arc shape, while the strip-like units of the lower micro-structures are of a U-shape, which is formed by being raised in a downward direction from the lower surface of light guide plate.

The strip-like units of the upper micro-structures are of a circular arc shape, while the strip-like units of the lower micro-structures are of a wavy shape.

The upper and lower micro-structures are set parallel to propagation direction of the light that emits from a backlight source traveling within the light guide plate.

The present invention also provides a light guide plate, which comprises an upper surface forming upper micro-structures and a lower surface forming lower micro-structures, the upper and lower micro-structures each comprising a plurality of periodically and successively juxtaposed strip-like units, each of the strip-like units forming a prism, the strip-like units of the upper and lower micro-structures being juxtaposed in the same direction;

wherein the strip-like units of the upper and lower micro-structures are selectively set in different shapes and specifications;

wherein the strip-like units of the upper micro-structures are of a circular arc shape, while the strip-like units of the lower micro-structures are also of a circular arc shape, arc length and radius of the circular arcs of the strip-like units of the lower micro-structures being smaller than arc length and radius of the circular arcs of the strip-like units of the upper micro-structures; and wherein the upper and lower micro-structures are set parallel to propagation direction of the light that emits from a backlight source traveling within the light guide plate.

The present invention further provides a side-edge backlight module, which comprises a backplane, a backlight source arranged inside the light guide plate, a light guide plate arranged inside the backplane to correspond to the backlight source, a reflector plate arranged on an undersurface of the light guide plate, and an optic film assembly disposed on a top surface of the light guide plate. The light guide plate has an upper surface forming upper micro-structures. The light guide plate has a lower surface forming lower micro-structures. The upper and lower micro-structures are set parallel to propagation direction of the light that emits from a backlight source traveling within the light guide plate. The upper and lower micro-structures each comprise a plurality of periodically and successively juxtaposed strip-like units. Each of the strip-like units forms a prism. The strip-like units of the upper and lower micro-structures are juxtaposed in the same direction.

The strip-like units of the upper micro-structures are of a circular arc shape, while the strip-like units of the lower micro-structures are also of a circular arc shape, arc length and radius of the circular arcs of the strip-like units of the lower micro-structures being smaller than arc length and radius of the circular arcs of the strip-like units of the upper micro-structures.

The strip-like units of the upper micro-structures are of a circular arc shape, while the strip-like units of the lower micro-structures are of a U-shape, which is formed by being raised in a downward direction from the lower surface of light guide plate.

The efficacy of the present invention is that the present invention provides a light guide plate that has upper and lower surfaces forming micro-structures. With the combination and arrangement of the upper micro-structures and lower micro-structures, collimation of light is improved after the light from an LED light source enters the light guide plate so as to improve convergence of the light inside a section. The present invention also provides a side-edge backlight module, which is formed by using the light guide plate, which reduces cross-talking between the sections and at the same time realizes reduction of cross-talking in backlight scanning so as to improve the performance of 3D displaying For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings:

FIG. 4 is a schematic view showing the distribution of brightness in a vertical direction for the light shape shown in FIG. 3;

FIG. 5 is a schematic view showing the variation of the width for half brightness as shown in FIG. 4 at different locations with respect to the distance;

FIG. 6 is a schematic view illustrating the distribution of cross-talking for 9 points on a backlight module including the upper-microstructured light guide plate of FIG. 3 in a 3D mode;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
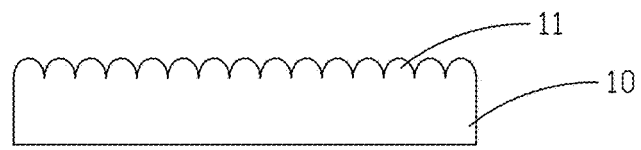
FIG. 1 is a side elevational view of a conventional light guide plate with upper microstructures.
Figure 2:
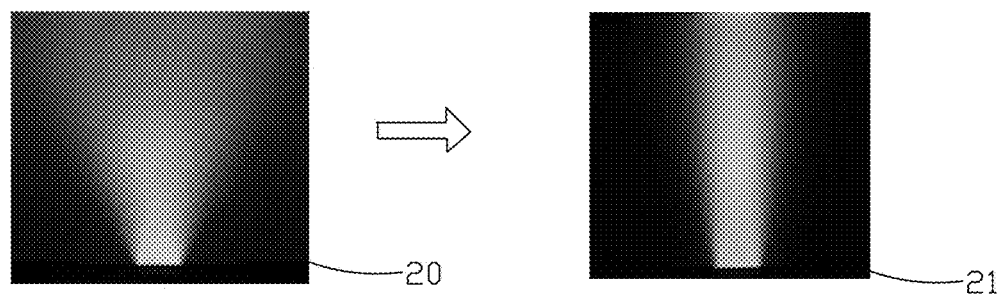
FIG. 2 is a schematic view illustrating difference of light shape between a conventional flat light guide plate and a light guide plate with upper microstructures.
Figure 3:
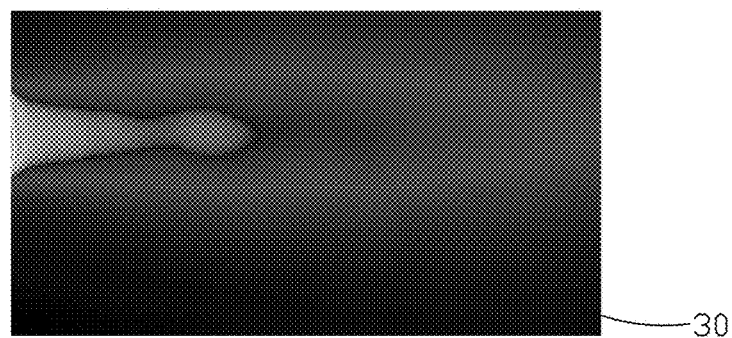
FIG. 3 is a schematic view showing the distribution of light field of a well known upper-microstructured light guide plate for the condition of one section being lit.
Figure 7:
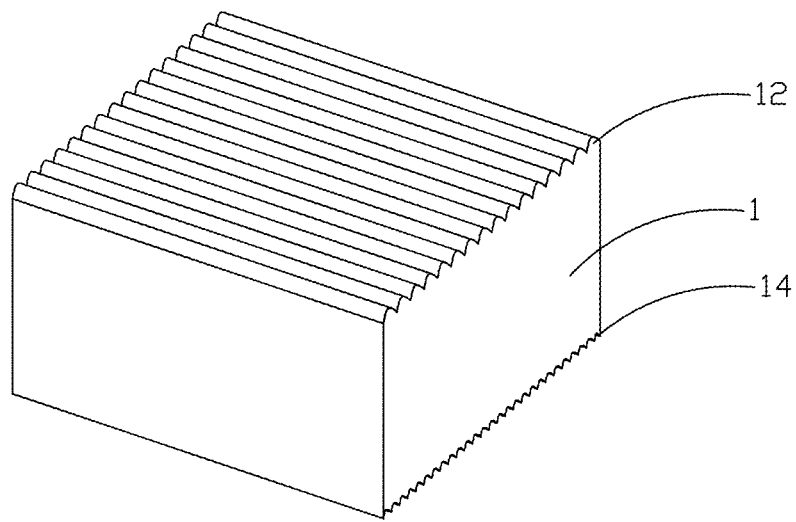
FIG. 7 is a perspective view showing a first preferred embodiment of the light guide plate according to the present invention.

Referring to FIG. 7, the present invention provides a light guide plate 1. The light guide plate 1 has an upper surface forming upper micro-structures 12. The light guide plate 1 has a lower surface forming lower micro-structures 14. The upper and lower micro-structures 12, 14 are set parallel to propagation direction of the light that emits from a backlight source traveling within the light guide plate 1. The upper and lower micro-structures 12, 14 each comprise a plurality of periodically and successively juxtaposed strip-like units. Each strip-like unit forms a prism. The strip-like units of the upper and lower micro-structures 12, 14 are juxtaposed in the same direction. The upper micro-structures are formed on the light exit surface of the light guide plate 1. The upper and lower micro-structures 12, 14 are arranged to be parallel to the propagation direction of the light emitting from the backlight source traveling within the light guide plate 1, whereby each section comprises a plurality of strip-like unit of the upper and lower micro-structures 12, 14. With the combination and arrangement of the upper and lower micro-structures 12, 14 of the light guide plate 1, the propagation direction of light is changed so as to improve collimation of the light after the light enters the light guide plate 1 and improve convergence of the light inside the light guide plate 1, whereby the light is confined within the section and thus reducing cross-talking among sections.

The strip-like units of the upper and lower micro-structures 12, 14 can be set in different shapes and specifications as desired. In the instant embodiment, the strip-like units of the upper micro-structures 12 are of a circular arc shape, while the strip-like units of the lower micro-structures 14 are also of a circular arc shape. The arc length and radius of the circular arcs of the strip-like units of the lower micro-structures 14 are smaller than the arc length of the circular arcs of the strip-like units of the upper micro-structures 12.

Figure 8:
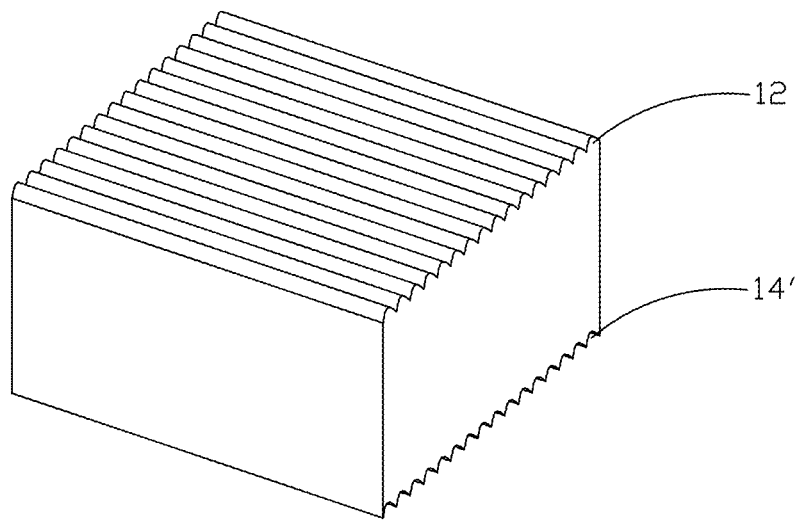
FIG. 8 is a perspective view showing a second preferred embodiment of the light guide plate according to the present invention.

Referring to FIG. 8, which is a perspective view showing a second preferred embodiment of the light guide plate according to the present invention, in the instant embodiment, the strip-like units of the upper micro-structures 12 are of a circular arc shape, while the strip-like units of the lower micro-structures 14' are also of a circular arc shape. The arc length and radius of the circular arcs of the strip-like units of the lower micro-structures 14' are identical to those of the circular arcs of the strip-like units of the upper micro-structures.

Figure 9:
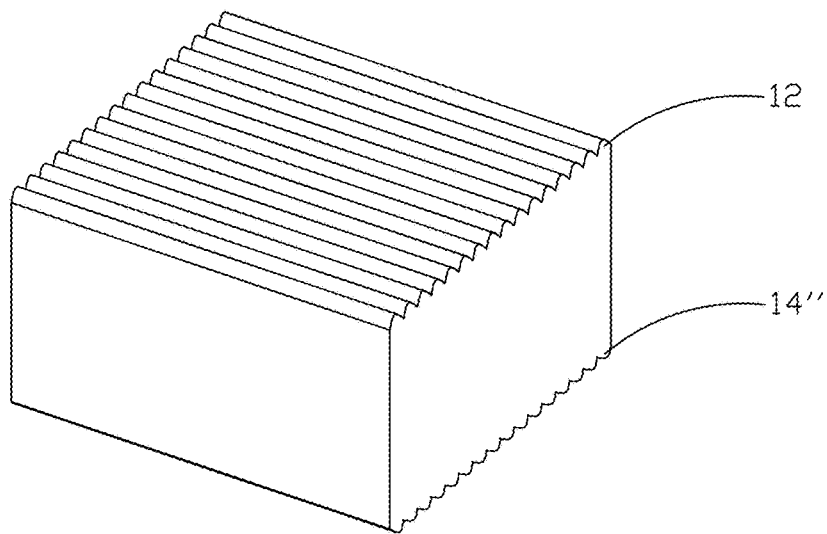
FIG. 9 is a perspective view showing a third preferred embodiment of the light guide plate according to the present invention.

Referring to FIG. 9, which is a perspective view showing a third preferred embodiment of the light guide plate according to the present invention, in the instant embodiment, the strip-like units of the upper micro-structures 12 are of a circular arc shape, while the strip-like units of the lower micro-structures 14" are of a U-shape, which is formed by being raised in a downward direction from the lower surface of light guide plate 1.

Figure 10:
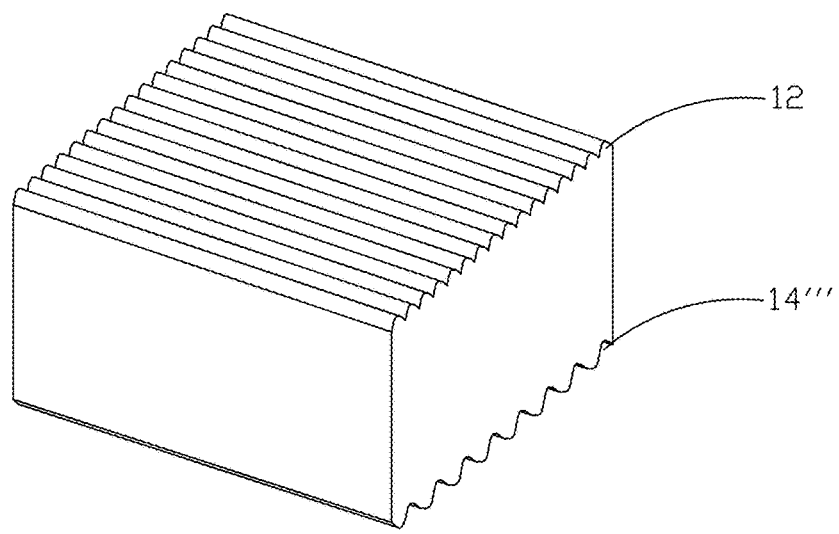
FIG. 10 is a perspective view showing a fourth preferred embodiment of the light guide plate according to the present invention.

Referring to FIG. 10, which is a perspective view showing a fourth preferred embodiment of the light guide plate according to the present invention, in the instant embodiment, the strip-like units of the upper micro-structures 12 are of a circular arc shape, while the strip-like units of the lower micro-structures 14''' are of a wavy shape.

In the above described embodiments, the strip-like units of the upper and lower micro-structures 12, 14 are all of an arc shape, but those having ordinary skills in the art may appreciate that the shape, structure, and distribution of the strip-like units of the upper and lower micro-structures 12, 14 can be varied and are not limited to those types illustrated in FIGS. 7-10.

Figure 11:
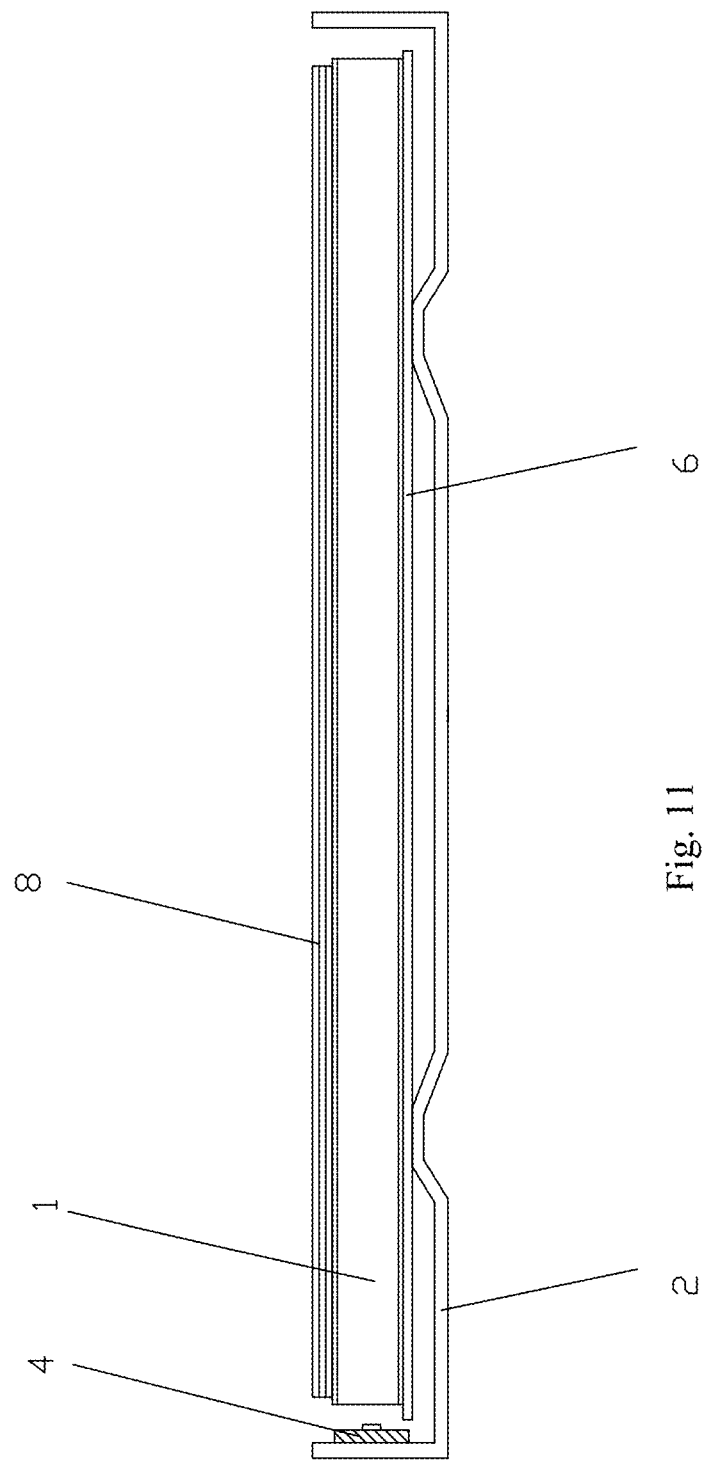
FIG. 11 is a perspective view showing a side-edge backlight module according to the present invention.

Referring to FIG. 11, in combination with FIG. 7, the present invention also provides a side-edge backlight module, which comprises: a backplane 2, a backlight source 4 arranged inside the light guide plate 2, a light guide plate 1 arranged inside the backplane 2 to correspond to the backlight source, a reflector plate 6 arranged on the undersurface of the light guide plate 1, and an optic film assembly 8 disposed on a top surface of the light guide plate 1. The light guide plate 1 has an upper surface forming upper micro-structures 12. The light guide plate 1 has a lower surface forming lower micro-structures 14. The upper and lower micro-structures 12, 14 are set parallel to propagation direction of the light that emits from a backlight source traveling within the light guide plate 1. The upper and lower micro-structures 12, 14 each comprise a plurality of periodically and successively juxtaposed strip-like units. Each strip-like unit forms a prism. The strip-like units of the upper and lower micro-structures 12, 14 are juxtaposed in the same direction. The upper micro-structures are formed on the light exit surface of the light guide plate 1. The upper and lower micro-structures 12, 14 are arranged to be parallel to the propagation direction of the light emitting from the backlight source traveling within the light guide plate 1, whereby each section comprises a plurality of strip-like unit of the upper and lower micro-structures 12, 14. With the combination and arrangement of the upper and lower micro-structures 12, 14 of the light guide plate 1, the propagation direction of light is changed so as to improve collimation of the light after the light enters the light guide plate 1 and improve convergence of the light inside the light guide plate 1, whereby the light is confined within the section and thus reducing cross-talking among sections.

The strip-like units of the upper and lower micro-structures 12, 14 can be set in different shapes and specifications as desired. In the instant embodiment, the strip-like units of the upper micro-structures 12 are of a circular arc shape, while the strip-like units of the lower micro-structures 14 are also of a circular arc shape. The arc length and radius of the circular arcs of the strip-like units of the lower micro-structures 14 are smaller than the arc length of the circular arcs of the strip-like units of the upper micro-structures 12. Further examples are that the strip-like units of the upper micro-structures 12 are of a circular arc shape, while the strip-like units of the lower micro-structures 14 are of a U-shape, which is formed by being raised in a downward direction from the lower surface of light guide plate 1

In summary, the present invention provides a light guide plate that has upper and lower surfaces forming microstructures. With the combination and arrangement of the upper micro-structures and lower micro-structures, collimation of light is improved after the light from an LED light source enters the light guide plate so as to improve convergence of the light inside a section. The present invention also provides a side-edge backlight module, which is formed by using the light guide plate, which reduces cross-talking between the sections and at the same time realizes reduction of cross-talking in backlight scanning so as to improve the performance of 3D displaying.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate, comprising an upper surface forming upper micro-structures and a lower surface forming lower micro-structures, the upper and lower micro-structures each comprising a plurality of periodically and successively juxtaposed strip-like units, each of the strip-like units forming a prism so that the prisms are arranged closely side by side and immediately next to each other for both the upper and lower micro-structures, the strip-like units of the upper and lower micro-structures being juxtaposed in the same direction, the prims of the strip-like units of the upper and lower micro-structures extending from one end of the light guide plate to an opposite end in a direction substantially parallel to light propagation within the light guide plate.

2. The light guide plate as claimed in claim 1, wherein the strip-like units of the upper and lower micro-structures are selectively set in different shapes and specifications.

3. The light guide plate as claimed in claim 2, wherein the strip-like units of the upper micro-structures are of a circular arc shape, while the strip-like units of the lower micro-structures are also of a circular arc shape, arc length and radius of the circular arcs of the strip-like units of the lower micro-structures being smaller than arc length and radius of the circular arcs of the strip-like units of the upper micro-structures.

4. The light guide plate as claimed in claim 2, wherein the strip-like units of the upper micro-structures are of a circular arc shape, while the strip-like units of the lower micro-structures are also of a circular arc shape, arc length and radius of the circular arcs of the strip-like units of the lower micro-structures being identical to arc length and radius of the circular arcs of the strip-like units of the upper micro-structures.

5. The light guide plate as claimed in claim 2, wherein the strip-like units of the upper micro-structures are of a circular arc shape, while the strip-like units of the lower micro-structures are of a U-shape, which is formed by being raised in a downward direction from the lower surface of light guide plate.

6. The light guide plate as claimed in claim 2, wherein the strip-like units of the upper micro-structures are of a circular arc shape, while the strip-like units of the lower micro-structures are of a wavy shape.

7. A light guide plate, comprising an upper surface forming upper micro-structures and a lower surface forming lower micro-structures, the upper and lower micro-structures each comprising a plurality of periodically and successively juxtaposed strip-like units, each of the strip-like units forming a prism so that the prisms are arranged closely side by side and immediately next to each other for both the upper and lower micro-structures, the strip-like units of the upper and lower micro-structures being juxtaposed in the same direction;

wherein the strip-like units of the upper and lower micro-structures are selectively set in different shapes and specifications;

wherein the strip-like units of the upper micro-structures are of a circular arc shape, while the strip-like units of the lower micro-structures are also of a circular arc shape, arc length and radius of the circular arcs of the strip-like units of the lower micro-structures being smaller than arc length and radius of the circular arcs of the strip-like units of the upper micro-structures; and wherein the prisms of the strip-like units of the upper and lower micro-structures extend from one end of the light guide plate to an opposite end in a direction substantially parallel to light propagation within the light guide plate.

8. A side-edge backlight module, comprising a backplane, a backlight source arranged inside the light guide plate, a light guide plate arranged inside the backplane to correspond to the backlight source, a reflector plate arranged on an undersurface of the light guide plate, and an optic film assembly disposed on a top surface of the light guide plate, the light guide plate having an upper surface forming upper micro-structures, the light guide plate having a lower surface forming lower micro-structures, the upper and lower micro-structures being set parallel to propagation direction of the light that emits from a backlight source traveling within the light guide plate, the upper and lower micro-structures each comprising a plurality of periodically and successively juxtaposed strip-like units, each of the strip-like units forming a prism so that the prisms are arranged closely side by side and immediately next to each other for both the upper and lower micro-structures, the strip-like units of the upper and lower micro-structures being juxtaposed in the same direction, the prims of the strip-like units of the upper and lower micro-structures extending from one end of the light guide plate to an opposite end in a direction substantially parallel to the light propagation direction within the light guide plate.

9. The side-edge backlight module as claimed in claim 8, wherein the strip-like units of the upper micro-structures are of a circular arc shape, while the strip-like units of the lower micro-structures are also of a circular arc shape, arc length and radius of the circular arcs of the strip-like units of the lower micro-structures being smaller than arc length and radius of the circular arcs of the strip-like units of the upper micro-structures.

10. The side-edge backlight module as claimed in claim 8, wherein the strip-like units of the upper micro-structures are of a circular arc shape, while the strip-like units of the lower micro-structures are of a U-shape, which is formed by being raised in a downward direction from the lower surface of light guide plate.

* * * * *